United States Patent

Almlöf et al.

[11] Patent Number: 5,590,519
[45] Date of Patent: Jan. 7, 1997

[54] COMBINED COMBUSTION AND EXHAUST GAS CLEANSING PLANT

[75] Inventors: Göran Almlöf, Malung; Folke Lilliehöök, Skanör, both of Sweden

[73] Assignee: BAL AB, Malung, Sweden

[21] Appl. No.: 362,596

[22] PCT Filed: Jul. 13, 1993

[86] PCT No.: PCT/SE93/00626

§ 371 Date: Jan. 10, 1995

§ 102(e) Date: Jan. 10, 1995

[87] PCT Pub. No.: WO94/01724

PCT Pub. Date: Jan. 20, 1994

[30] Foreign Application Priority Data

Jul. 13, 1992 [SE] Sweden ................................ 9202155

[51] Int. Cl.$^6$ .............................................. F02C 7/00
[52] U.S. Cl. .................................... 60/39.33; 60/39.5
[58] Field of Search ............................. 60/39.12, 39.33, 60/39.464, 39.5, 39.52, 39.53, 39.55

[56] References Cited

U.S. PATENT DOCUMENTS

| 3,736,745 | 6/1973 | Karig | 60/39.52 |
|---|---|---|---|
| 4,392,871 | 7/1983 | Almlöf et al. | |
| 4,434,613 | 3/1984 | Stahlby | 60/39.52 |
| 4,498,289 | 2/1985 | Osgerby | 60/39.52 |

FOREIGN PATENT DOCUMENTS 3924908  1/1991  Germany.

Primary Examiner—Louis J. Casaregola
Attorney, Agent, or Firm—Frishauf, Holtz, Goodman, Langer & Chick

[57] ABSTRACT

A combined combustion and exhaust gas filter plant including a combustion chamber (5) for pressurized combustion of combustible substances, a supply device (3, 8) for supplying up to 100 percent oxygen enriched combustion air to the combustion chamber (5), and a scrubber (10, 12) for pressurized cooling and washing with water of exhaust gases produced by the combustion chamber (5). The scrubber (10, 12) separates environmentally endangering materials and other contaminants from the exhaust gases and includes a deducting device for deducting the washing water and the environmentally endangering materials and other contaminants captured, dissolved or condensed in the washing water. An expansion device (14, 20) is coupled to the scrubber (10, 12) and expands remaining exhaust gases in one or more steps such that a sufficiently low temperature is achieved at an output of the expansion device (14, 20) for condensing remaining environmentally endangering materials and other contaminants contained in the remaining exhaust gases. A separating device (16, 22) is coupled to the expansion device (13, 20) for separating the condensed remaining environmentally endangering materials and other contaminants from the remaining exhaust gases and for collecting the condensed remaining environmentally endangering materials and other contaminants in solid or liquid form. A pump (27) is coupled to the separating device (22) for sucking out the remaining exhaust gases from the separating device (22) at a predetermined pressure close to 0 bar.

12 Claims, 1 Drawing Sheet

５,590,519

COMBINED COMBUSTION AND EXHAUST GAS CLEANSING PLANT

BACKGROUND OF THE INVENTION

The present invention relates to a combined combustion and exhaust gas filter plant.

Such plants are already known and have in practice performed well. The filtering degree can be made extremely high and plants of this kind need little space, which is important during the conversion of existing plants. All steps for achieving this have been concentrated on the filter process itself. However, it has been shown to possibly achieve further improvements by a better matching of the combustion means and the expansion gas filter plant.

SUMMARY OF THE INVENTION

Therefore, it is the purpose of the invention to achieve further improvements of the filtering effect and the space requirements for a combined combustion and exhaust gas filter plant.

The combined combustion and exhaust gas filter plant of the present invention includes a combustion chamber (5) for pressurized combustion of combustible substances, a supply device (3, 8) for supplying up to 100 percent oxygen enriched combustion air to the combustion chamber (5), and a scrubber (10, 12) for pressurized cooling and washing with water of exhaust gases produced by the combustion chamber (5). The scrubber (10, 12) separates environmentally endangering materials and other contaminants from the exhaust gases and includes a deducting device for deducting the washing water and the environmentally endangering materials and other contaminants captured, dissolved or condensed in the washing water. An expansion device (14, 20) is coupled to the scrubber (10, 12) and expands remaining exhaust gases in one or more steps such that a sufficiently low temperature is achieved at an output of the expansion device (14, 20) for condensing remaining environmentally endangering materials and other contaminants contained in the remaining exhaust gases. A separating device (16, 22) is coupled to the expansion device (13, 20) for separating the condensed remaining environmentally endangering materials and other contaminants from the remaining exhaust gases and for collecting the condensed remaining environmentally endangering materials and other contaminants in solid or liquid form. A pump (27) is coupled to the separating device (22) for sucking out the remaining exhaust gases from the separating device (22) at a predetermined pressure close to 0 bar.

DESCRIPTION OF THE PREFERRED EMBODIMENT

Figure 1:
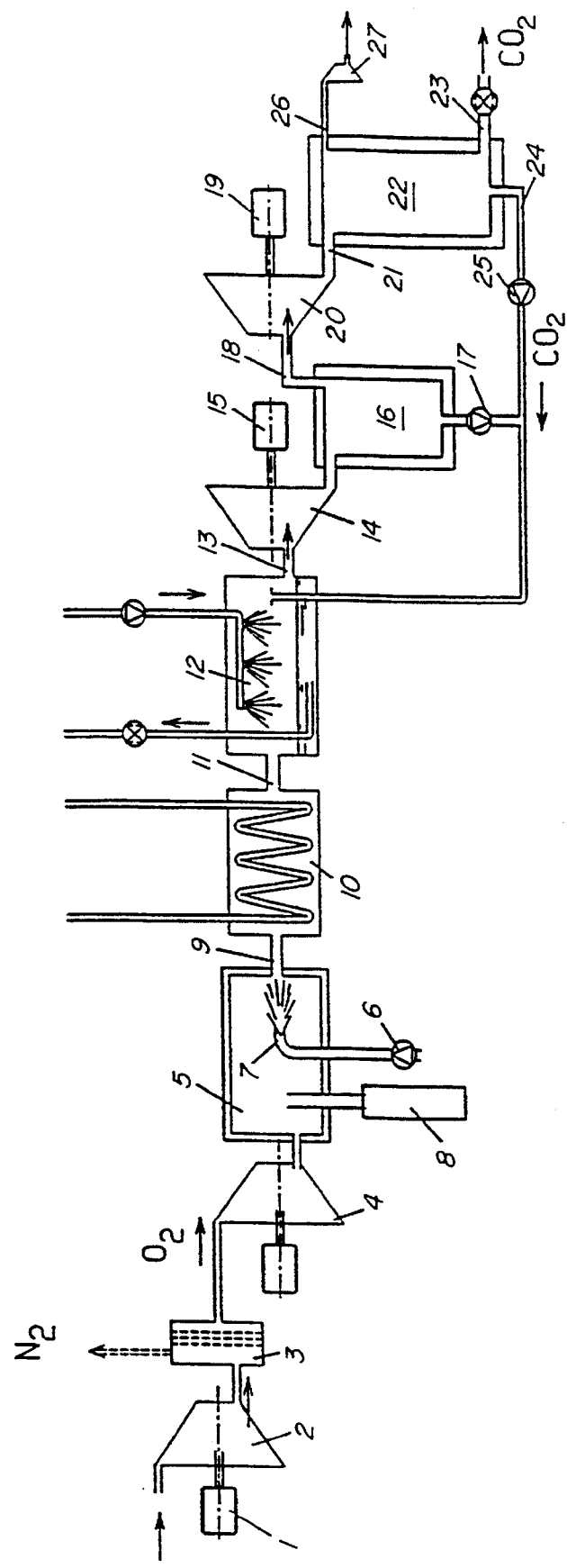
FIG. 1 is a schematic drawing of a combined combustion and exhaust gas filter plant according to the present invention.

The present invention connects the combustion chamber in a combined combustion and exhaust gas filter plant beginning to a means for the supply of combustion air enriched up to 100% with oxygen gas and connects a separating means to a vacuum pump or similar for the disposal by pumping of the small amounts of not condensed gases being accumulated in the separating means after the last expansion step.

Combustion air contains four parts of nitrogen on one part of oxygen as well as some minor quantities of other substances. The combustion is relying on the presence of sufficient quantities of oxygen, whereas the nitrogen only has a negative influence. On one hand, the nitrogen is creating a number of dangerous substances during the combustion and on the other hand the gas mass is heavily increased. Already an increase of the oxygen of up to two parts oxygen for three parts nitrogen is decreasing the required combustion air to a half. Pure oxygen would result in a compressor effect being 80 percent less. The heavily decreased volume of combustion air makes it possible to essentially limit the size of the combustion chamber. The temperature in the combustion chamber will rise as the same amount of energy is set free during the combustion. The temperature rise can be balanced by means of larger heat accumulating areas and increased heat radiation.

On the exhaust gas filter side an extremely pure exhaust gas can be achieved, the content of nitrogen being possibly reduced in the combustion chamber. Otherwise, different kinds of nitrogen oxides are created in the presence of nitrogen during the combustion and these are very difficult to separate. During a combustion with pure oxygen no nitrogen oxides will be created, independent of if high combustion temperatures are obtained or not. In an oxygen enriched atmosphere water soluble oxides $N_2$ and $N_2O_5$ are created in the first place and these are comparatively easy to separate.

The exhaust gases will consist of $N_2$, $CO_2$, $H_2O$ and small amounts of nitrogen oxides as well as contaminants coming from the fuel. Part of the water vapour is condensed in the washing means together with the water and $NO_2$ and $N_2O_5$ are solved therein as well as a major part of the existing contaminants of the $SO_3$ and Cl type and others. After the washing means there will only occur $N_2$, $CO_2$ and small amounts of substances not being water soluble eller being condensed at a temperature prevailing directly after the washing means. The more enriched with oxygen the combustion air is, so much smaller amounts of nitrogen will exist in the flue gases directly before the expansion device. Of course, the amount of nitrogen oxides and other contaminants can be reduced as a complement by adding different chemicals to the washing water.

In the expansion means the temperature is lowered to a level being determined by the incoming gas temperature and the pressure drop. If the final temperature is lying below −50° C. the contaminants in the exhaust gases will be condensed together with the water vapour in the gas. When the temperature is falling below −120° C. even all carbon dioxide has been condensed. If the pressure drop in the expansion means occurs in one step the frozen snow and the carbon dioxide snow will contain the contaminants. Therefore, it might be convenient to perform the expansion in two steps, one for condensating the snow and the contaminants and the other for condensing the pure carbon dioxide.

By this means water, carbon dioxide and all contaminants in the exhaust gases possibly have been eliminated. There remain only possibly existing nitrogen and inert gases. If only oxygen had been used almost all gases would have been converted to condensate and by continually feeding out the condensate and moreover keeping the separating chamber closed to the atmosphere outside, the final pressure can be kept close to 0 bar. This low pressure is increasing the pressure drop in the expansion means or the last one of these and ameliorates its efficiency very considerably. The efficiency is also increasing with oxygen contents below 100 percent, but not to such an extent. To maintain this low pressure a vaccum pump is used which continually is sucking away remaining gases from the separation means.

With lower temperature before the first expansion unit the temperature after the expansion means will drop lower. By recycling carbon dioxide snow to the washing means a better cooling is obtained before the expansion on one part and on the other part a considerably larger gas flow is achieved through the expansion means. In straight thermodynamical terms a gas turbine system according to the original concept is requiring the supply of mechanical energy, the outlet temperature being lower than the inlet temperature. However, the process might be changed by recycling condensed carbon dioxide in the way mentioned above and by this means to reach a balance in the system, i.e. the expansion can produce so much energy as the compression requires. By recycling more carbon dioxide the expansion means will produce more mechanical energy than is required by the compressor. In such a way heat energy can be transformed to mechanical energy. The maximal transformation is obtained by recycling so much condensed carbon dioxide that its vaporization heat corresponds to the energy otherwise supplied during combustion or to the system. In a practical embodiment it should also be observed that the expansion means temperature is lying above 0° C. Also it is possible to externally supply thermal energy, for example, to the expansion means in form of water with a temperature lying above 0° C. Then this energy is also converted to mechanical energy.

In certain cases the pressure can be augmented between the expansion steps by a compressor or by heating the gas by means of a heat exchanger. By limiting the amount of nitrogen in the exhaust gases, the amount of gas to be compressed can be limited.

By cooling the gas between the expansion steps, conveniently by means of the cold gas, originated after the expansion, a lower final temperature is achieved or, alternatively, a given final temperature with a lower original pressure and, thus, a minor compression effect.

The simplest way to limit the amount of nitrogen in the incoming combustion air is to supply the necessary oxygen from an oxygen gas bottle. In larger plants a better economy implies the use of e.g. a gas separating membrane. Then, the oxygen produced is used in the combustion plant whereas the pressurized nitrogen can drive a generator or be stored pressurized for further use. The membrane technology and other separating methods are showing a fast development and therefore the methods to obtain more or less pure oxygen can be of interest, e.g. for the production of oxygen from water.

The exhaust gases from the plant of the kind mentioned above can during the start-up period be recycled to the combustion chamber by means of a compressor. The exhaust gases are clear from all the environment effecting substances and are probably cleaner than the incoming combustion air.

The electric energy required to produce oxygen and the required compressors and pumps, respectively, can be obtained in plants being provided with an equipment as above. The low temperature the plant is driven at can be used for other processes requiring low temperatures.

The plant according to the invention can be modified in different ways to be used in combination with thermal or electric power plants and combustion engines can possibly be developed in this way with high efficiency rendering completely pure exhaust gases being cleared of even carbon dioxide.

A preferred embodiment of the present invention will now be described in detail with respect to FIG. 1.

FIG. 1 shows a compressor 2 driven by a motor 1 and being connected to a oxygen/nitrogen separating membrane 3, the oxygen side of which is via eventually a further compressor 4 connected to a combustion chamber 5. Into the chamber is leading a fuel supply line 6 with a burner 7 for e.g. oil. Moreover, material containing the environment endangering substances can be supplied into the combustion chamber 5 in a suitable, here not shown way for combustion purposes in the chamber 5. Possibly, also a bottle 8 containing oxygen can be connected to the chamber for, if necessary, increasing the oxygen content.

The exhaust gases are leaving the chamber 5 via a line 9 being connected to a boiler/cooler 10 reducing the exhaust gas temperature somewhat before being supplied into a scrubber 12 for a washing and a further pressurized cooling. Some part of the water vapor in the exhaust gases is here condensed. The condensate is used together with the washing water in the scrubber to take care of certain contaminants in particle form as well in water soluble form being thereafter in a known manner conducted out of the pressurized scrubber. The exhaust gases containing the remaining contaminants are led from the scrubber via a line 13 to a first expansion machine 14, for example of the rotary screw type, being adapted to drive an electric generator 15. A fast pressure reduction is achieved via the expander as well as a temperature drop to about −50° C. of the exhaust gases passing the expander and thereafter being fed into a first separating chamber 16 in form of e.g. frozen condensate containing a number of contaminants which can be deducted through an output means 17. The remaining exhaust gases are fed through a line 18 to a second expander 20 driving an electric generator 19, where the exhaust gases are exposed for a further, fast pressure reduction and accompanying temperature drop to ca. −120° C. in such a way as to condense the remaining exhaust gases mainly consisting of carbon dioxide, the condensate then possibly been output from an second separating chamber 22 with an output line 23 connected with the expander 20 via a line 21. A further output line 24 containing a pump 25 is adapted to recycle the carbon dioxide condensate to the scrubber 12 for evaporating the carbon dioxide and for its renewed expansion. The possibly remaining exhaust gases being filtered to a high degree are leaving the separating chamber 22 by an output line 26 being equipped with a vaccum pump 27 maintaining a certain vacuum in the chamber 22.

Possibly, the low temperature of the carbon dioxide in the line 24 can be used even for a further cooling at the input to the second or the further expanders of the rotary screw type, being possibly arranged. Likewise, a compressor can possibly be set in to increase the input pressure of the second expander and of further expanders being possibly arranged.

Finally, the chilliness can be used to cool the compression in the compressors 2 and 4 to reduce the required compression effect.

The process can for a number of points also be modified according to known solution principles, e.g. by heating, cooling or compressing the gas between the various expansion steps, to achieve a lower final temperature, a larger power output and other purposes.

Carbon dioxide and especially clean carbon dioxide, will in future with an adaption of the present invention probably become an important raw material within the chemical industry.

We claim:

1. A combined combustion and exhaust gas filter plant comprising:

a combustion chamber (5) for pressurized combustion of combustible substances;

supply means (3, 8) for supplying up to 100 percent oxygen enriched combustion air to said combustion chamber (5);

a scrubber (10, 12) for pressurized cooling and washing with water of exhaust gases produced by said combustion chamber (5), said scrubber (10, 12) separating environmentally endangering materials and other contaminants from the exhaust gases and including deducting means for deducting the washing water and the environmentally endangering materials and other contaminants captured, dissolved or condensed in the washing water;

expansion means (14, 20), coupled to said scrubber (10, 12), for expanding remaining exhaust gases in one or more steps such that a sufficiently low temperature is achieved at an output of said expansion means (14, 20) for condensing remaining environmentally endangering materials and other contaminants contained in the remaining exhaust gases;

separating means (16, 22), coupled to said expansion means (13, 20), for separating the condensed remaining environmentally endangering materials and other contaminants from the remaining exhaust gases and for collecting the condensed remaining environmentally endangering materials and other contaminants in solid or liquid form; and pump means (27), coupled to the separating means (22), for sucking out the remaining exhaust gases from said separating means (22) at a predetermined pressure close to 0 bar.

2. The combined combustion and exhaust gas filter plant according to claim 1, wherein the supply means (3, 8) comprises a pressurized container (8) of liquid oxygen.

3. The combined combustion and exhaust gas filter plant according to claim 1, wherein the supply means (3, 8) comprises an oxygen separating membrane (3) having an oxygen side coupled to the combustion chamber (5).

4. The combined combustion and exhaust gas filter plant according to claim 1, wherein the pump means (27) comprises a vacuum pump (27) for maintaining a vacuum in said separating means (22).

5. The combined combustion and exhaust gas filter plant according to claim 2, wherein the pump means (27) comprises a vacuum pump (27) for maintaining a vacuum in said separating means (22).

6. The combined combustion and exhaust gas filter plant according to claim 3, wherein the pump means (27) comprises a vacuum pump (27) for maintaining a vacuum in said separating means (22).

7. The combined combustion and exhaust gas filter plant according to claim 1, further comprising recycling means (24, 25) for recycling at least part of the condensed remaining environmentally endangering material and other contaminants collected by said separating means (22) back to said scrubber (10, 12) for reprocessing through said scrubber, said expansion means, and said separating means.

8. The combined combustion and exhaust gas filter plant according to claim 2, further comprising recycling means (24, 25) for recycling at least part of the condensed remaining environmentally endangering material and other contaminants collected by said separating means (22) back to said scrubber (10, 12) for reprocessing through said scrubber, said expansion means, and said separating means.

9. The combined combustion and exhaust gas filter plant according to claim 3, further comprising recycling means (24, 25) for recycling at least part of the condensed remaining environmentally endangering material and other contaminants collected by said separating means (22) back to said scrubber (10, 12) for reprocessing through said scrubber, said expansion means, and said separating means.

10. The combined combustion and exhaust gas filter plant according to claim 4, further comprising recycling means (24, 25) for recycling at least part of the condensed remaining environmentally endangering material and other contaminants collected by said separating means (22) back to said scrubber (10, 12) for reprocessing through said scrubber, said expansion means, and said separating means.

11. The combined combustion and exhaust gas filter plant according to claim 5, further comprising recycling means (24, 25) for recycling at least part of the condensed remaining environmentally endangering material and other contaminants collected by said separating means (22) back to said scrubber (10, 12) for reprocessing through said scrubber, said expansion means, and said separating means.

12. The combined combustion and exhaust gas filter plant according to claim 6, further comprising recycling means (24, 25) for recycling at least part of the condensed remaining environmentally endangering material and other contaminants collected by said separating means (22) back to said scrubber (10, 12) for reprocessing through said scrubber, said expansion means, and said separating means.

* * * * *